Nov. 29, 1966 R. D. LELAND 3,289,085
PORTABLE TRANSMITTER STRUCTURE
Filed Oct. 9, 1963 3 Sheets-Sheet 1
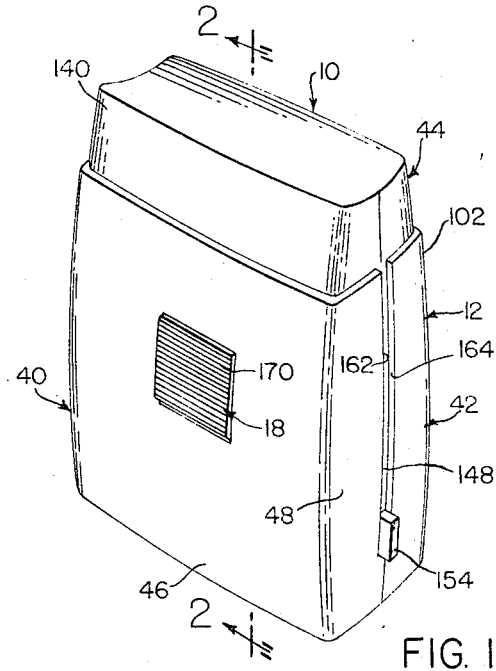
FIG. 1
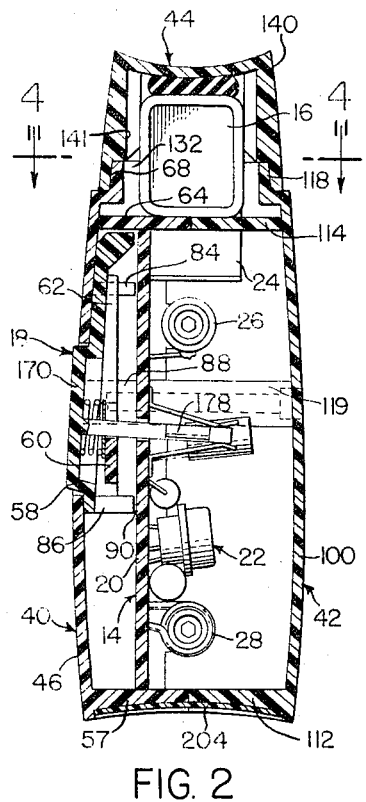
FIG. 2
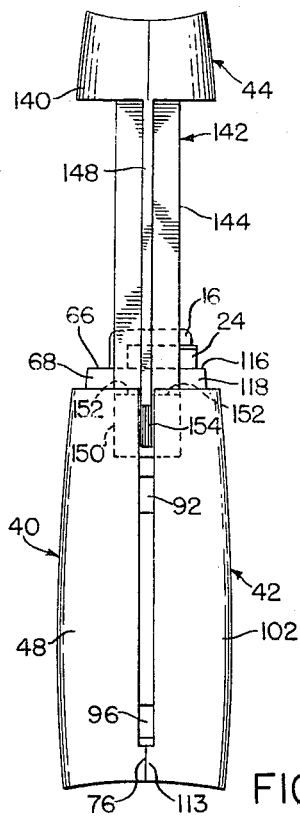
FIG. 3
FIG. 4
INVENTOR.
ROBERT D. LELAND
BY
ATTORNEY

INVENTOR.
ROBERT D. LELAND
BY
ATTORNEY

INVENTOR.
ROBERT D. LELAND
ATTORNEY

# United States Patent Office 3,289,085
Patented Nov. 29, 1966

3,289,085
PORTABLE TRANSMITTER STRUCTURE
Robert D. Leland, Royal Oak, Mich., assignor to Multi-Elmac Company, Oak Park, Mich., a corporation of Michigan
Filed Oct. 9, 1963, Ser. No. 314,971
16 Claims. (Cl. 325—119)

This invention relates to a portable transmitter structure of the radio frequency type, and more particularly to such a device embodying novel and inventive features of construction.

The invention involves a portable transmitter having in combination a housing composed of three principal interconnected parts, an independent integrated transmitter circuit board readily insertable and removable from the housing but not secured to the housing, a manually operable push button in the housing for operating the transmitter but not secured to the housing nor to the transmitter, an enclosed battery compartment within the housing separate from the circuit board compartment whereby the battery can be replaced without opening the housing to the circuit board, and a removable closure or cap for the battery and battery compartment forming a component of the housing and having tines adapted to engage the other two components of the housing so as to shield and cover openings in such components through which adjustments in the circuit board can be made without opening the housing to the circuit board in its normally closed position, and to admit an adjusting tool to such openings when the cap is partially or completely withdrawn from the housing. The battery cap tines embody a locking feature which is manually operable to engage and disengage the cap with the other two parts of the housing. The structure is further provided with a flexible connector that secures the latter two parts of the housing together at one end in the event that these two parts are disconnected for examination or replacement of the circuit board normally retained therein and therebetween.

The transmitter structure is so arranged that it easily fits the palm of the hand and can be operated by merely depressing the switch plate or button disposed in substantially flush relationship with one face of the housing. To replace a weak or exhausted battery, the battery cover or cap is retracted or partially withdrawn from the housing, exposing the battery on its rest and admitting the fingers for manual removal of the battery. The battery rest, composed of shelves formed in each of the two housing mating sections separates the battery compartment of the housing from the circuit board compartment within the housing, whereby the circuit board and its components, except for the battery clips projecting into the battery compartment from the circuit board compartment therebelow, are confined and protected from manual handling or mishandling of the operator.

In the event that circuit board components require adjustment, such components being aligned with openings in lateral interior walls of the housing halves, retraction of the battery cover also retracts the lateral tines which cover such openings, and adjustments can be made by inserting a suitable tool through such openings to the components. Thus, adjustments are made without separating the housing sections, whereby the circuit board and its components are again protected against damage or mishandling. Upon returning the cover to its normally closed position, the tines engage the housing halves and lock the cover in place over the battery, the tines overlying the adjustment openings.

At times, it may be necessary to open the housing for replacement of circuit board components or other correction. The two mating sections of the housing, after removal of the cover, are secured together by the decorative flexible end panel which is adhered to the outer surface of the bottom portions of the two sections. By such means, the sections are held together against loss or damage of either section occasioned by their separation.

The switch or push button is readily separable and insertable into the housing and operates by manual depression of the button or switch plate which pivots against the circuit board. A switch post projecting from the button and through the circuit board makes and breaks a switch comprising a pair of spring clips bearing on the post in opposed relationship.

The circuit board is fabricated as an integral unit, and is provided with battery clips projecting from and beyond one end of the board whereby they will pass through from the enclosed circuit board compartment to the exposed battery compartment at the head end of the housing. Such construction does not require connector members fixed to the housing sections, leaving the housing free of operating transmitter components.

A principal object of the invention is the provision of a hand or portable transmitter adapted to be held in and operated by one hand. Another object is to provide a housing for the transmitter in which the power source, a small battery, is readily accessible for replacement without full disassembly of the housing, by way of a removable separable battery cap. A further object is the provision of access openings through the housing walls for admission of tools to adjust transmitter components without disassembly of the housing, by means of a battery cap having lateral tines that cover or expose such openings upon a sliding motion of the tines within the housing. Yet another object is to provide a readily separable and insertable operating push button for the transmitter that requires no fixed connection to the housing or to the transmitter. A still further object is to provide a flexible hinge for the housing sections that secure such sections together against damage or loss occasioned by disassembly of the housing for repair or maintenance of the circuit board.

These and additional objects of the invention and features of construction will become more readily apparent from the description given below, in which the terms employed are used for purposes of description and not of limitation.

Reference is made to the drawings annexed hereto forming an integral part of this specification and in which FIGURE 1 is a perspective view of a structure embodying the inventive concept.

FIGURE 2 is a vertical transverse sectional view taken substantially medially on the line 2—2 of FIGURE 1.

FIGURE 3 is a side elevational view of the structure shown in FIGURE 1 with the battery cap upwardly extended, the cap tines remaining in their slots.

FIGURE 4 is a top plan view of the housing sections taken substantially on the line 4—4 of FIGURE 2.

Figures 5, 6:
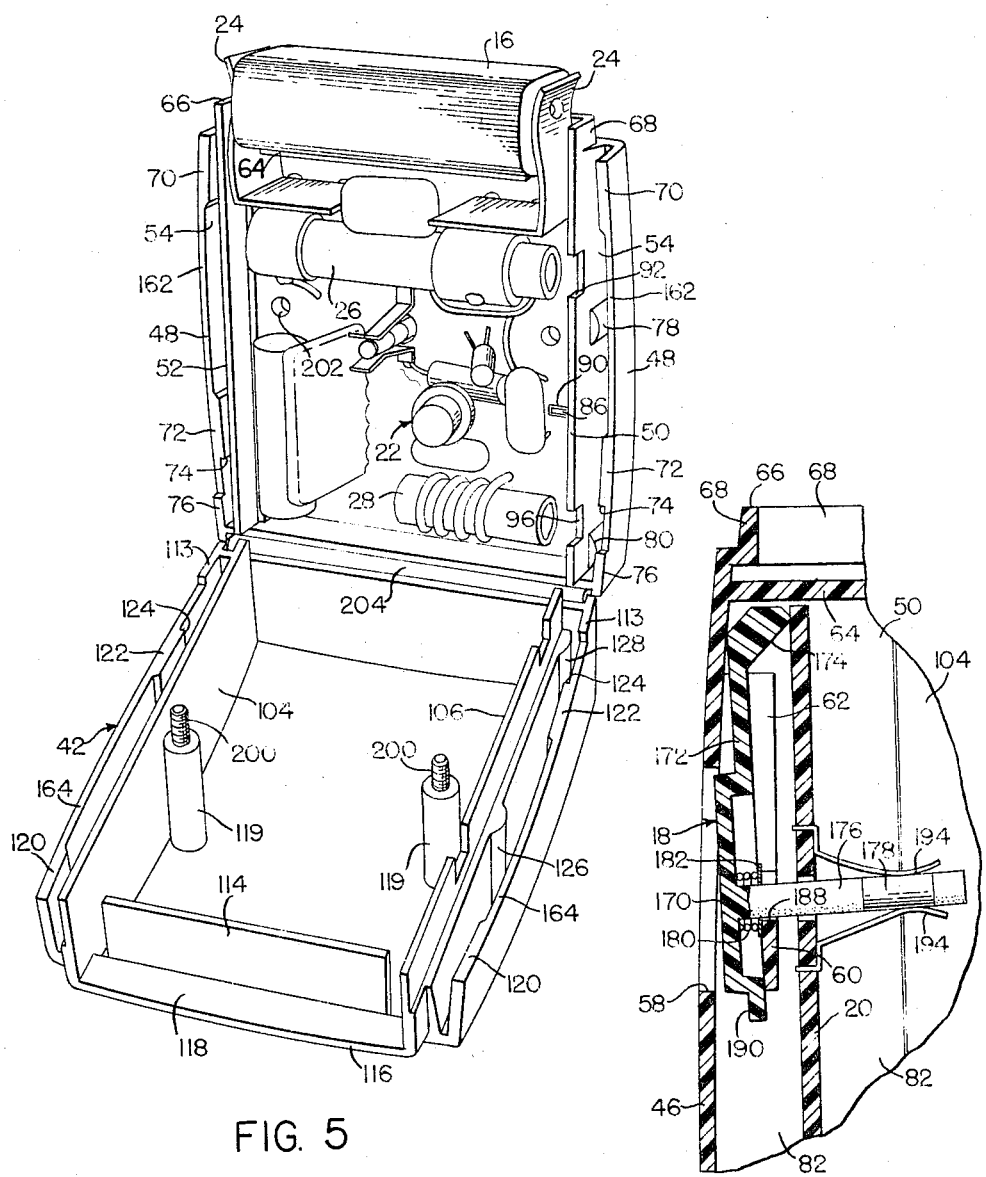
FIGURE 5 is a perspective view of the housing sections opened to expose the circuit board in its compartment.
FIGURE 6 is a fragmentary vertical sectional view showing the push button in circuit closing position.

As shown in the several views of the drawings, the portable transmitter 10 comprises a transmitter housing 12, a circuit board 14, and a batttery or energy source 16 for the circuit board 14, and a push button 18.

The circuit board 14 comprises a panel board 20 supporting a printed circuit and components generally designated as 22 including but not limited to battery clips 24, 24 and inductance coils 26, 28 mounted upon the panel board 20 in fixed relationship thereto. The components 22 are mounted on one side of the panel board, their leads passing through the board and being electrically connected by a printed circuit on the other side of the panel board in conventional manner. Attention is directed to the battery clips 24, 24 that project from and beyond one end of the circuit board. All of the components face inwardly of the housing so that upon separation of the housing sections, as described below, they are readily accessible for inspection, maintenance or repair. However, the entire circuit board is readily removable from the housnig merely by lifting the same therefrom.

The housing 12 of molded plastic materials comprises a pair of opposed sections 40, 42 and a cover or cap 44. As shown in several views of the drawings, the housing section 40 comprises a front wall 46, lateral walls 48, 48, inner lateral walls 50, 52 spaced apart from the outer walls to define a slot or passageway 54, 54 at each side of the section, a bottom wall 57, a push button opening 58 in the outer front wall 46, a push button stop 60 secured to inwardly projecting side members 62, 62 adjacent the opening 58 and spaced inwardly from the front wall 46, and a battery rest 64 projecting inwardly of the wall 46 adjacent but spaced from the upper edge 66 of an indented crown or gallery wall 68.

The lateral walls 48, 48 are each provided with a thickened pad 70 adjacent the upper edge of the wall, a thickened pad 72 at an intermediate position of the wall, having a shoulder 74, and forwardly projecting flange 76. The inner lateral walls 50, 52 are each provided with a crowned pad 78 directed into the slot 54, 54 respectively at a point intermediate the length of the wall 50 or 52, and a crowned pad 80 adjacent the lower end of these walls and the section bottom wall 57.

Inwardly of the front wall 46 and within and adjacent the inner lateral walls 50, 52, defining the circuit board compartment 82, are the circuit board locating lugs 84, 84 and 86, 86 and screw receiving sockets 88, 88 all molded into the section. The panel board 20 comes to rest against the lugs 84, 84 adjacent the battery rest 64 and upon the sockets 88, 88. Edges of the panel board adjacent the lateral slots 90, 90 are located upon the lugs 86, 86, a portion of which project up through the slots.

It will be observed that the inner lateral walls 50, 52 project beyond the edges of the outer lateral walls 48, 48. The walls 50, 52 each have slots cut partially into and through the walls at spaced intervals. These slots, designated generally as 92 and 96, are spaced apart from each other at positions which correspond with and are in register with certain components 22 such as the coils 26, 28 that are adjustable by tools which can be inserted from a position exteriorly of the housing section through any of the slots 92 or 96 and into or to the coils or components, as the case may be, for manual adjustment of such components.

Complementing the housing section 40 is the section 42 which comprises a rear wall 100, lateral walls 102, 102, inner lateral walls 104, 106 spaced from the outer walls 102, 102 and defining a slot or passage 108, 108 therebetween at each side of the section, a bottom wall 112, a forwardly projecting flange 113 on the outer walls adjacent the bottom wall, a battery rest 114 projecting inwardly from the rear wall 100 adjacent but spaced from the upper edge 116 of an indented crown or gallery wall 118. Screw passing sleeves 119 are molded into the wall 100 adjacent the inner lateral walls 104, 106.

As in the case of the housing section 40, the outer lateral walls are provided with pads 120, 122 in alignment with the pads 70 and 72 of the housing section 40 when in adjacent closed relationship. The lower pads 122 also have a shoulder 124 in alignment with the shoulder 74 of the pad 72. Similarly, the inner walls 104, 106 have crowned pads 126, 128 in alignment with the crowned pads 78 and 80 of the housing section 40. The section inner walls 104, 106 are further provided with slots which register with the slots 92 and 96 of section 40 to provide through openings into the compartment 82 for admission of the adjusting tools referred to above, when the two sections are closed together over the circuit board 14 by the complementary overlapping portions of the inner walls 50, 52 and 104, 106 of both sections.

The panel board mounted battery clips 24, 24 pass upwardly from compartment 82 into the battery compartment 132, which is defined by the indented crown walls 68 and 118 of the housing sections 40 and 42 respectively, through lateral slots 134, 134 between the battery rests 64 and 114, which form the base of the battery compartment, and the adjacent lateral inner walls. Battery 16 is placed between the clips 24, 24 by springing them apart, and it rests upon the ledges 64, 114.

The cover 44, which is fully removable from the housing sections 40 and 42, comprises a cap portion 140 defining a battery enclosure 141 overlying the battery and clips projecting upwardly from the crown walls 68 and 118, and having depending tines 142 at each end of the cap portion for insertion into the slots 54, 108 of the complementary housing sections 40, 42 when conjoined in closed relationship. The tines are provided with a relatively flat body 144 having a flat inner face 146, a longitudinally extending medial rib 148 on the outer face, wedge terminal ends 150 having laterally projecting shoulders 152, and medial digitally operable tabs 154 in alignment with the medial rib 148. The tabs 154 and ribs 148 pass into slots 160 formed by the outer spaced apart opposed edges 162, 164 of the section walls 48 and 102, the ribs 148 lying fully within the slots 160 and the tabs 154 projecting laterally outwardly of the walls 48 and 102. When the cover 44 is inserted to full seating position, the tine inner face 146 passes over and rests upon the crowned pads 78, 80 of section 40 and crowned pads 126, 128 of section 42. The tines being long and flat, and made of a plastic material, are relatively flexible. Upon insertion, the outer face of the tines slide over and bear upon the housing pads 70 and 72 of section 40 and pads 120, 122 of section 42. As the wedge ends 150 pass and bear against the lower pads 72 and 122, the tip ends of the wedges are forced laterally inwardly. Further advancing the wedge ends to locking position bring the wedge shoulders 152, 152 firmly against the pad shoulders 74, 74 and 124, 124 of the two sections.

Upon squeezing the upper ends of the tabs 154 inwardly, the shoulders 152 are disengaged from the outer wall pad shoulders and an upward force upon the tabs slides the wedge ends 150 off the lower crowned pads 80 and 128, freeing the cover 44 for retraction along the slots 54, 108 and 160, or for removal entirely from the housing sections 40 and 42.

The integrally formed push button 18 comprises a digitally operable plate 170, a lever portion 172 extending from the plate to a pivot bar 174 projecting laterally of the plane of the lever portion in a direction offset from the plate. A switch post 176 projects from the plate 170 and supports an annular metal band 178, a spring 180 and a washer 182. The plate lies in housing section opening 58 in a manner substantially flush with the plane of the front wall 46, the lever portion 172 being disposed within the compartment 82 adjacent the inner surface of the front wall and above the opening, the pivot bar 174 extending substantially the full width of the compartment 82 between the inner lateral walls 50, 52 so as to bear upon substantially the width of the panel board 20 at its upper edge adjacent the battery rest 64.

The switch post 176 seats and rides in a slot 188 cut in the stop 60, biasing the spring 180 against washer 182. To restrict the plate 170 from outward movement, it is provided with a lower projecting flange 190 that seats inside of and engages the inner surface of the front wall 46 below the opening 58.

The post 176 projects beyond the stop 60, through an opening in the panel board 20 and into switching position between the switch clips 194, 194 mounted upon the panel board. Digital depression inwardly of the plate 170 forces the post 176 to travel longitudinally of the clips 194, 194 until the band 178 reaches and contacts the clips, closing a circuit between them. Upon release of the plate, the spring 180 biases the push button outwardly so that the band 178 breaks contact with the switch clips, opening the circuit.

In normal use the transmitter 10 is arranged with its complementary housing sections 40, 42 secured together about and upon the circuit board 14 by screws 200 passed through the sleeves 119, the panel board openings 202 and into screw receiving sockets 88 molded in section 40. The digital ends of the sleeves 119 and sockets 88 abut the panel board 20 on either side thereof to secure the panel board in a fixed relationship within the compartment 82 so as to align the switch clips 194, 194 with respect to the switch post 176.

At the bottom of the sections 40 and 42, as viewed in FIGURE 2, the bottom walls 57 and 112 are covered with a decorative layer 204 of a flexible material such as vinyl, polyethylene, polypropylene or other similar material secured to the exterior surfaces of these walls by a suitable adhesive, or by any other suitable means.

The normal operation or use of the portable transmitter 10 is as follows. The transmitter is usually placed in the palm of the hand with the push button plate 170 in a top plan position, subject to contact by the thumb of the hand. Depression of the plate 170 by the thumb causes the bar 174 to bear against the panel board 20 as a pivot and the post 176 to pass between the switch clips 194, 194 until metal band 178 engages and contacts the clips, whereupon the circuit provided by the circuit board 14 is closed. Release of the thumb from the plate 170 permits the spring 180 to bias the plate to its initial substantially flush position in the opening 58, as seen in FIGURES 1 and 2.

Closing of the circuit by the push button 18 initiates a radio frequency pulse to a receiving set (not shown), which set in turn can effect the actuation of an electromechanical device, such as a motor, or a garage door operator, or any other device subject to control or actuation.

Figure 7:
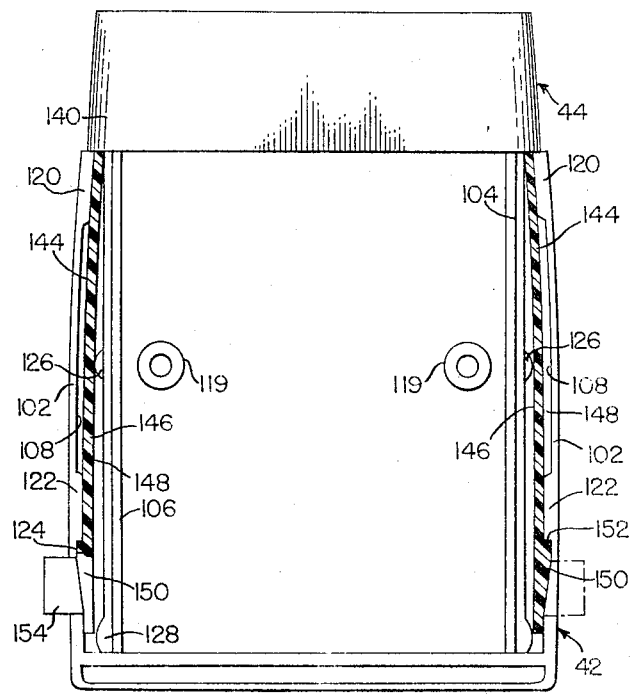
FIGURE 7 is an elevational view looking into the rear housing section, the cap being locked in position, with a section broken away to illustrate the tine wedge portion at one side engaged with the lateral outer wall.
Figure 8:
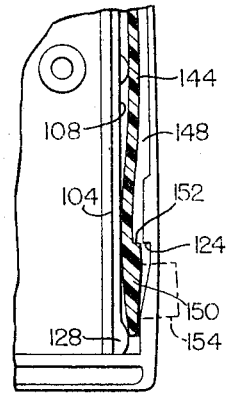
FIGURE 8 is a fragmentary elevational view of the lower right corner of the view in FIGURE 7 illustrating the deflection of the locking wedge portion upon inward movement of the projecting tab, releasing the tine from engagement with the lateral outer wall.
Figure 9:
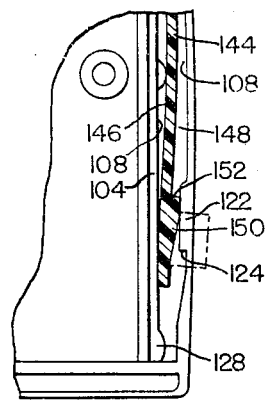
FIGURE 9 is a view similar to FIGURE 8 illustrating the position of the wedge portion in the slot between the lateral inner and outer walls as it is withdrawn upwardly.

In time, the energy source of the transmitter, such as the battery 16, will become weak or exhausted through service and use, the circuit board components remaining in satisfactory and useable condition. In such event, the cover 44 is partially withdrawn from the housing sections 40 and 42 in the following manner. The case is held in one hand while the thumb and a finger of the other hand apply inward pressure upon the tabs 154, forcing the upper ends of the wedge portions 150 inwardly as their lower ends bear against the crowned pads 80 and 128 in slots 54 and 108 on each lateral side of the sections (FIGURES 7, 8 and 9). When the wedge shoulders 152 have cleared the pad shoulders 124 in the slots, a further application of pressure on the tabs 154 slides the tines 142 and the battery cap 140 upwardly exposing the battery 16 in its compartment 132 at the top end of the housing. It will be observed that such exposure of the battery is made without separating the housing sections 40 and 42 by removal of screws 200, or other disassembly of the case. To replace the battery the tines need not be entirely removed from the sections. Upon digital grasping of the battery 16, it is easily lifted from the battery clips 24, 24 and a new battery is as easily installed therebetween.

A similar operation is performed for an initial or a later adjustment of the inductance coils 26, 28 on the circuit board in register with the slotted openings 92 and 96. Upon raising the tines 142, these openings are exposed for access of adjusting tools to the coils, or to other adjustable components on the circuit board in register with such openings. It will, of course, be understood that adjustment openings can be positioned at any point along the lateral inner walls on either or both sides of the housing.

After the battery has been replaced or the adjustments made, the cap 140 is simply pressed downwardly to seating position about the crown walls 68, 118, the tine wedge portions 150 seating in the slots 54, 108 with their shoulders 152 abutting and engaging the lateral outer wall shoulders 124 under urging of the lower crowned pads 80 and 128 and the intermediate crowned pads 78 and 126.

To replace, remove or repair the circuit board 14, the cover 44 is preferably first completely removed from the housing sections 40 and 42 in the manner above described, then screws 200 are withdrawn, and section 42 is pivoted away from section 40 upon the flexible connector or hinge 204. The circuit board 14 can be grasped by the battery, its clips or a component to simply lift it from the compartment 82, or the housing can be tilted over and circuit board 14 complete with battery will fall out of section 40. The battery clips 24, 24 slide out of the housing slots 134, 134 and the switch clips 194, 194 slide off the post 176. The two housing sections 40 and 42 remain connected together by virtue of the decorative plastic film material 204, protecting the sections against loss of individual sections that sometimes become mislaid or damaged when separated.

A new or repaired circuit board is then reinserted into section 40, the panel board 20 coming to rest upon the molded lugs 84 and 86 at each side of the compartment. Housing section 42 is pivoted back upon the circuit board and the screws 200 replaced and secured. Upon reinsertion of the cover 44, its tines passing into slots 54, 108 and 160, the transmitter housing is now reassembled and the transmitter is again ready for tuning, and thereafter for use.

It will be understood that the tine wedge portions 150 and their complementary locking pads 72 and 122, shown upon the lateral outer walls of the sections 40 and 42, may be disposed in other relative positions. For instance, the tine locking portions can be disposed at positions remote from the ends of the tines, and such locking features can be directed inwardly to the lateral inner walls intead of toward the outer walls, the inner walls providing a complementary locking or securing means. In addition, the tine slots 54 and 108 shown in alignment with each other could as easily be offset with respect to each other, the tine body 144 assuming a configuration complementary with such new slot design. Similarly, the slot 160 at each side of the case 12 can be offset from center to another position for design purposes.

As to materials employed or to be employed in the construction of the transmitter structure 10, moldable plastic materials are preferred for the case cover 44 and housing sections 40 and 42. However, in certain instances other non-conductive materials can be used for one or more of such elements. The circuit board 14, its panel board 20 and the several components 22 are of conventional materials, although they may be arranged in certain novel and unique relationships that form no part of this disclosure or invention.

Having described the invention in its simplest terms, it is to be understood that the features of construction above described may be changed and varied in greater or lesser degree without departing from the essence of the invention defined in the appended claims.

I claim:
1. In a portable transmitter case,
a pair of substantially complementary sections connected together and forming a housing having compartments for components of said transmitter,
said sections having substantially aligned adjacent lateral inner and outer walls defining slots therebetween at the sides of said sections,
and a removable cover for and at one end of said sections having tines projecting therefrom,
said tines adapted to slide within said slots between said inner and outer lateral walls and to engage said sections in cover securing relationship with said sections.

2. In a portable transmitter case,
a pair of substantially complementary sections connected together and forming a housing having compartments for components of said transmitter,
means connecting said sections for pivoting movement of said sections one from the other,
said sections each having parallel spaced apart lateral inner and outer walls defining longitudinally extending slots therebetween,
said walls of each section being in alignment with and adjacent complementary walls of the other section whereby said slots are in register to provide longitudinally extending passageways at the sides of said sections,
the edges of said aligned lateral outer walls being spaced slightly from each other to define longitudinally extending slots therebetween at each side of said housing,
and a removable cover for one end of said housing having tines projecting therefrom in substantially parallel spaced apart relationship,
said tines each having a body adapted to slide within said longitudinally extending slots and to engage in a releasable locking relationship with said housing sections upon seating of said cap upon said housing end.

3. The structure defined in claim 2, and
said lateral outer walls being provided with indented portions defining recessed shoulders adjacent but spaced from the lower terminal ends of said walls,
said tines each having a wedge shaped portion on said tine body adjacent its lower end defining projecting shoulders adapted to engage with and seat against said wall recessed shoulders for releasably locking said cap to said housing.

4. The structure defined in claim 2, and in which
said tines each have a longitudinally extending medial rib projecting from the outer face thereof,
said rib adapted to slide and be disposed in said slot between the opposed aligned edges of said lateral outer walls,
said tine body adapted to slide and be disposed within said slots between said parallel lateral and outer walls,
said lateral outer walls being provided with indented portions defining recessed shoulders,
said tines each having a wedge shaped portion on said tine body defining projecting shoulders adapted to engage with and seat against said wall recessed shoulders for releasably locking said cover to said housing.

5. The structure defined in claim 4, and in which
said recessed shoulders in said lateral outer walls are disposed adjacent but spaced from the lower terminal ends of said latter walls,
and said tine wedge shaped portions are disposed adjacent the lower ends of said tine bodies.

6. The structure defined in claim 2, and in which
said housing sections are connected at their lower ends by a flexible connector secured to each said section.

7. The structure defined in claim 2, and
said lateral inner walls of each said housing section being disposed in partially overlapping relationship at each side of said housing,
said lateral inner walls of each said housing section having one or more slotted openings along their edges,
said openings of each said inner wall being in register with the openings in each said complementary inner wall when in overlapping relationship.

8. The structure defined in claim 7, and in which
said tine bodies overlie and conceal said slotted openings through said inner walls when said bodies are disposed in substantially fully locked relationship with said lateral outer walls,
and said tine bodies expose said slotted openings to access when said bodies are withdrawn along or from said slots.

9. The structure defined in claim 2, and in which
said tine bodies are each provided with an outwardly projecting digitally operable tab,
said tabs being digitally engageable to release said tine bodies from locking engagement with said housing sections,
said tine bodies being movable in said slots upon digital applications of force upon said tabs.

10. In a portable transmitter,
a case for said transmitter comprising
a pair of substantially complementary sections connected together and forming a housing having compartments for components of said transmitter,
means connecting said sections for pivoting movement of said sections one from the other,
said sections having substantially aligned adjacent lateral inner and outer walls defining slots therebetween at the sides of said sections,
a circuit board embodying transmitter components disposed within said complementary sections,
digitally operable switch means operatively associated with said circuit board,
and a removable cover for and at one end of said sections having tines projecting therefrom,
said tines adapted to slide within said slots between said inner and outer lateral walls and to engage said sections in cover securing relationship with said sections.

11. The structure defined in claim 10, and in which said circuit board is free of attachment within and to either of said housing sections.

12. In a portable transmitter,
a case for said transmitter comprising
a pair of substantially complementary sections connected together and forming a housing having an interior enclosed compartment for components of said transmitter and an enclosable battery compartment at one end of said housing,
means connecting said sections for pivoting movement of said sections one from the other,
a circuit board embodying transmitter components disposed within said complementary sections and comprising
a panel board adapted to seat in said interior enclosed compartment having battery contacts projecting from said panel board into said enclosable compartment,
a battery providing a source of energy for said circuit board,
said battery adapted to rest in said enclosable compartment between and in engagement with said contacts, a removable cover for said housing end adapted to overlie and to enclose said battery and said battery compartment,
    said cover having means adapted to engage said sections in cover securing relationship therewith.

13. The structure defined in claim 12, and in which said sections are provided with aligned battery rests dividing and separating said interior enclosed and enclosable compartments, said battery rests having edges spaced inwardly from the lateral walls of said sections to provide openings for admission of said battery contacts from said panel board in said enclosed compartment to said enclosable compartment.

14. In a portable transmitter case, a pair of substantially complementary sections connected together and forming a housing having a compartment for components of a transmitter, said housing having an opening at one end thereof, said housing having lateral inner and outer wall elements defining a longitudinally extending channel slot therebetween at each side of said housing, and a removable cover for and at said open end of said housing having tines projecting therefrom at the sides of said cover,
    said tines adapted to be removably disposed within said slots and to engage said wall elements in cover securing relationship.

15. In a portable transmitter case, a pair of substantially complementary sections connected together and forming a housing having a compartment for components of a transmitter, said housing having an opening at one end thereof, said housing having lateral inner and outer wall elements defining a longitudinally extending channel slot therebetween at each side of said housing,
    said lateral outer wall elements having openings therethrough aligned with said slots providing access from a position exteriorly of said case into the said compartment within said housing, and a removable cover for and at said open end of said housing having tines projecting therefrom at the sides of said cover,
    said tines adapted to be removably disposed within said slots between said lateral inner and outer wall elements, to overlie and close said openings in said outer wall elements from access to said compartment, and to engage at least some of said wall elements in cover securing relationship.

16. In a portable transmitter case, a housing having a compartment for components of a transmitter, said housing having an opening for said compartment at one end thereof, said housing having lateral inner and outer wall elements defining a longitudinally extending channel slot therebetween at each side of said housing, and a removable cover for and at said open end of said housing having tines projecting therefrom at the sides of said cover,
    said cover when withdrawn from said opening adapted to expose a battery component of said transmitter in said compartment at said open end for facile replacement of said battery component,
    said tines adapted to be removably disposed within said slots and to engage said wall elements in cover securing relationship.

References Cited by the Examiner
UNITED STATES PATENTS 2,947,812   8/1960   Parmet et al.
3,105,938  10/1963  Onninigian et al. _ 325—119 XR DAVID G. REDINBAUGH, *Primary Examiner.*
JOHN W. CALDWELL, *Examiner.*